US007601238B2

(12) United States Patent
Takahashi

(10) Patent No.: US 7,601,238 B2
(45) Date of Patent: Oct. 13, 2009

(54) PRINTER AND ADHESIVE LABEL MANUFACTURING DEVICE

(75) Inventor: Masanori Takahashi, Chiba (JP)

(73) Assignee: Seiko Instruments Inc. (JP)

( * ) Notice: Subject to any disclaimer, the term of this patent is extended or adjusted under 35 U.S.C. 154(b) by 678 days.

(21) Appl. No.: 11/288,734

(22) Filed: Nov. 29, 2005

(65) Prior Publication Data

US 2006/0130977 A1 Jun. 22, 2006

(30) Foreign Application Priority Data

Dec. 15, 2004 (JP) ............................ 2004-363124

(51) Int. Cl.
*B32B 37/00* (2006.01)

(52) U.S. Cl. ...................... 156/270; 156/250; 156/277; 156/384; 156/510

(58) Field of Classification Search ................ 156/250, 156/269, 270, 277, 384, 387, 510, 555, 582, 156/583.1
See application file for complete search history.

(56) References Cited

U.S. PATENT DOCUMENTS 7,104,713 B2 * 9/2006 Hoshino et al. ............. 400/621
7,173,642 B2 * 2/2007 Nureki ....................... 347/187
7,213,993 B2 * 5/2007 Takahashi et al. ........... 400/619
7,275,880 B2 * 10/2007 Obuchi et al. .......... 400/120.01
2003/0189631 A1 10/2003 Hoshino et al.
2004/0218961 A1 11/2004 Hoshino et al.

* cited by examiner

*Primary Examiner*—James Sells
(74) *Attorney, Agent, or Firm*—Adams & Wilks

(57) ABSTRACT

A heat-sensitive adhesive sheet is inserted into a printing device and heated by a thermal head to perform printing on a printable layer of the sheet. After printing, the heat-sensitive adhesive sheet is conveyed forward until the leading edge of the sheet abuts upon a guide roof member. While contacting the guide roof member, the leading edge of the heat-sensitive adhesive sheet is slid down and guided along the guide roof member to the nip portion of a pair of insertion rollers and is held at the nip. Once the insertion rollers have been halted, or have begun rotating slowly, the heat-sensitive adhesive sheet is conveyed further and deflected downward and assumes a concave shape. Then, the heat-sensitive adhesive sheet is cut to a predetermined length by a cutting device, and the heat-sensitive adhesive layer of the cut portion is heated and thermally activated by a thermal activation device.

14 Claims, 6 Drawing Sheets

PRINTER AND ADHESIVE LABEL MANUFACTURING DEVICE

BACKGROUND OF THE INVENTION

1. Field of the Invention

The present invention relates to a printer that employs a heat-sensitive adhesive sheet, wherein a heat-sensitive adhesive layer, which normally is not adhesive but becomes adhesive when thermally activated, is deposited on one face of a sheet base material, and produces an adhesive label that has desired characters, symbols, numbers or images recorded on the obverse face and adhesive on the reverse face, and relates to a method for producing such an adhesive label.

2. Description of the Related Art

Conventionally, as disclosed in Japanese Patent Laid-Open Publication No. Hei 11-79152, a heat-sensitive adhesive sheet having a heat-sensitive adhesive layer that becomes adhesive when heated has been put to practical use. The heat-sensitive adhesive sheet has several advantages, such as that handling the sheet before it is heated is easy and that no industrial waste is generated because release paper is not required. In order to manifest the adhesive property of the heat-sensitive adhesive layer on the heat-sensitive adhesive sheet, heating the sheet may be performed using a thermal head, one such as is commonly used for a thermal printer. Moreover, when the face of the heat-sensitive adhesive sheet opposite the thermal adhesive layer is a heat-sensitive printing enabled layer, the same type of thermal head can be used both for printing and for heating the thermal adhesive layer.

A printer for producing adhesive labels has been developed whereby desired characters, symbols, numbers or images can be printed on a printing enabled layer of a heat-sensitive adhesive sheet, the heat-sensitive adhesive sheet can be cut into predetermined lengths, and the adhesive property of the heat-sensitive adhesive layer can be manifested so that the thus produced labels can be attached to products to provide, for example, unit prices or product names (see FIG. 5). This printer includes: a printing device 101, for recording desired characters, numbers, symbols and images on a printing enabled layer 100*b*; a cutting device 102, for cutting a heat-sensitive adhesive sheet 100 into lengths that can serve as labels; a thermal activation device 103, for thermally activating a heat-sensitive adhesive layer 100*a* to manifest adhesion; and a conveying mechanism, for conveying the heat-sensitive adhesive sheet 10 through the printer. The printing device 101 includes: a heater (a print thermal head 104) used for printing, which contacts and heats the printing enabled layer 100*b*; and a first conveying unit (a print platen roller 105), which conveys the heat-sensitive adhesive sheet 100. The thermal activation device 103 includes: a heater (a thermal head 106 for thermal activation) used for thermal activation, which contacts and heats the heat-sensitive adhesive layer 100*a*; and a second conveying unit (a pair 107*a* of inserted rollers and a platen roller 107*b* for thermal activation), which conveys the heat-sensitive adhesive sheet 100. Generally, the cutting device 102 is located between the printing device 101 and the thermal activation device 103, and cuts into labels the heat-sensitive adhesive sheet 100 that has been printed.

For this printer, before the cutting device 102 begins to perform the cutting operation, the conveying forward of the heat-sensitive adhesive sheet 100 must be halted for a period of time (e.g., 0.4 seconds) while a movable blade is moved vertically. That is, while the printing device 101 and the second conveying device of the thermal activation device 103 are halted, the cutting device 102 cuts the heat-sensitive adhesive sheet 100. Therefore, when the adhesive label to be produced is longer than the distance from the cut position of the cutting device 102 to the thermal head 106 of the thermal activation device 103, the operation is halted while the heat-sensitive adhesive sheet 100 is held between the thermal head 106 and the platen roller 105 used for thermal activation. As a result, the heat-sensitive adhesive layer for which adhesion has now been manifested adheres to the thermal head 106. Thus, when sheet feeding is resumed after the cutting has been completed and a label has been produced, the heat-sensitive adhesive sheet 100 is not fed smoothly, and a so-called jam occurs, one which in turn causes a conveying failure. Further, heat generated by the thermal head 106 is transmitted to the printing enabled layer 100*b*, which causes color development.

An adhesive label that is thus produced and discharged from the printer is not appropriate for use because its appearance is not pleasing. Furthermore, when an adhesive label has become firmly adhered to the thermal head 106 of a printer, all the separate operations being performed must be halted and remedial maintenance must be performed. Thus, as described above, the efficiency with which adhesive labels are produced is deteriorated.

Therefore, in Japanese Patent Laid-Open Publication No. 2003-316265, a configuration is disclosed wherein the speeds of a printing device 101 and the conveying unit of a thermal activation device 103 are limited a heat-sensitive adhesive sheet 100 is deflected and assumes a convex shape between a cutting device 102 and the thermal activation device 103; and while the operation of the conveying means is halted, the cutting device 102 begins the cutting of the heat-sensitive adhesive sheet 100 (see FIG. 6). Specifically, a guide floor member 108 is located below and substantially parallel to the path along which the heat-sensitive adhesive sheet 100 is conveyed, and located above this path, respectively arranged at the front end and at the rear end of the guide floor member 108, are a pair of induction guides 109. According to this arrangement, for the portion of the heat-sensitive adhesive sheet 100 nearer the leading edge and along the guide floor member 108 the forward speed is decelerated, or the forward movement is halted, so that the portion of the heat-sensitive adhesive sheet 100 nearer the trailing edge is conveyed faster than the portion nearer the leading edge. In this manner, an extra long portion of the heat-sensitive adhesive sheet 100 is obtained on the guide floor member 108, between the induction guides 109, and is deflected upward, assuming a convex shape between the induction guides 109. As a result, an adhesive label of a desired length can be efficiently produced.

To produce multiple adhesive labels, generally, a roll member 110, around which the heat-sensitive adhesive sheet 100 is wound, is prepared in advance, and as the heat-sensitive adhesive sheet 100 is progressively unwound from the roll member 110, printing, cutting and thermal activation of the heat-sensitive adhesive sheet 100 are performed.

According to the printer described in Japanese Patent Laid-Open Publication No. 2003-316265, a print thermal head 104 for a printing device 101 is located above the path along which the heat-sensitive adhesive sheet 100 is conveyed, and located below this path is a thermal head 106 for a thermal activation device 103. Therefore, the heat-sensitive adhesive sheet 100 is fed with a printing enabled layer 100*b* facing upward and a heat-sensitive adhesive layer 100*a* facing downward. In this case, as shown in FIG. 6, when the heat-sensitive adhesive sheet 100 is wound around the roll member 110 with the printing enabled layer 100*b* outside and the heat-sensitive adhesive layer 100*a* inside, the winding direction of the roll member 110 matches the direction in which the heat-sensitive adhesive sheet 100 is to be deflected between the cutting device 102 and the activation device 103. Thus, the heat-sensitive adhesive sheet 100 can be smoothly deflected, and conveying and cutting of the sheet can be smoothly performed.

However, the printing enabled layer 100*b* is the surface on which characters, symbols, numbers or images are represented when an adhesive label is completed, and on this surface, smudging is not desirable. Furthermore, there is a case wherein when the roll member 110 is formed the heat-sensitive adhesive sheet 100 is wound with the printing enabled layer 100*b* inside. In this case, as shown in FIG. 7, since the direction in which the roll member 110 is wound is the reverse of the direction in which the heat-sensitive adhesive sheet 100 is to be deflected, the heat-sensitive adhesive sheet 100 can not be smoothly deflected and appropriately cut to desired lengths, and smooth sheet feeding may not be performed. As a result, adhesive labels of the desired lengths can not be produced, the manufacturing accuracy is very low, and deterioration of the production yield occurs.

SUMMARY OF THE INVENTION

Therefore, the objectives of 'the present invention are to provide a printer that can smoothly deflect a heat-sensitive adhesive sheet in a direction that matches a direction in which the heat-sensitive adhesive sheet is wound around a roll member, and can easily cut the heat-sensitive adhesive sheet to predetermined lengths, and a method for manufacturing an adhesive label.

To achieve these objectives, a printer according to the present invention comprises:

a printing device for printing a printing enabled layer of a heat-sensitive sheet obtained by forming the printing enabled layer on one face of a sheet base material and forming a heat-sensitive adhesive layer on the other face;

a cutting device, located downstream of the printing device, for cutting the heat-sensitive adhesive sheet to a predetermined length;

a thermal activation device, located downstream of the cutting device, for activating the heat-sensitive adhesive layer using heat; and a guide portion, located between the cutting device and the thermal activation device, for deflecting the heat-sensitive adhesive sheet downward in a concave shape, wherein an insertion point for the thermal activation device for the heat-sensitive adhesive sheet is located at a position lower than a delivery point for the cutting device for the heat-sensitive adhesive sheet, wherein a guide roof member is provided for the guide portion that is located above a sheet conveying path, extending from the delivery point of the cutting device to the insertion point for the thermal activation device, wherein, when the leading edge of the heat-sensitive adhesive sheet, which has been delivered to the cutting device from the delivery point, abuts upon the guide roof member, the heat-sensitive adhesive sheet, while in contact with the guide roof member, is slid down and guided to the entrance of the thermal activation device.

According to this arrangement, since the heat-sensitive adhesive sheet can be cut before the sheet enters the thermal activation device, a defect, such as a jam caused by the heat-sensitive adhesive sheet sticking to the thermal activation device, can be prevented, no maintenance is required to remove the jam, and the efficiency for producing adhesive labels can be considerably improved. Furthermore, according to this arrangement, the heat-sensitive adhesive sheet is deflected downward, forming a concave shape, in order for the sheet to be cut to a predetermined length. Therefore, the heat-sensitive adhesive sheet can be easily and smoothly deflected in consequence with the direction in which the sheet is wound.

The printer further comprises:

a roll member storage unit for holding a roll member around which is wound the heat-sensitive adhesive sheet to be supplied to the printing device. According to this arrangement, in addition to the configuration of the conventional printer, a choice is provided for selecting the direction in which the heat-sensitive adhesive sheet is to be deflected, in consonance with the direction in which the roll member is wound.

The printing device includes: a heater, used for printing, for contacting and heating the printing enabled layer; and a first conveying unit for conveying the heat-sensitive adhesive sheet. The thermal activation device includes: a heater, used for thermal activation, for contacting and heating the heat-sensitive adhesive layer, and a second conveying unit for conveying the heat-sensitive adhesive sheet. By controlling the second conveying unit and the first conveying unit speeds, the heat-sensitive adhesive sheet can be deflected downward to form a concave shape at the guide portion. With this arrangement, the heat-sensitive adhesive sheet can be deflected very easily, and a length to be cut can be accurately designated.

An adhesive label manufacturing method according to the invention comprises:

a printing step of a printing device heating and printing a printing enabled layer of a heat-sensitive sheet provided by forming the printing enabled layer on one face of a sheet base material and forming a heat-sensitive adhesive layer on the other face;

a cutting step, following the printing step, of a cutting device cutting the heat-sensitive adhesive sheet to a predetermined length; and a thermal activation step, following the cutting step, of a thermal activation device heating and, thermally activating the heat-sensitive adhesive layer;

a step, preceding the cutting step, of deflecting the heat-sensitive adhesive sheet downward, so as to form a concave shape between the cutting device and the thermal activation device, until a portion, extending from the leading edge of the heat-sensitive adhesive sheet, which is delivered to the cutting device from a delivery point, to a portion facing the cutting device reaches a desired length for an adhesive label, whereby the step of deflecting the heat-sensitive adhesive sheet downward into a concave shape includes a step of conveying the heat-sensitive adhesive sheet so that the leading edge abuts against a guide roof member positioned above the sheet path and extending from the delivery point for the cutting device to an insertion point for the thermal activation device, the position of the insertion point being lower than the delivery point, and sliding the heat-sensitive adhesive sheet, while in contact with the guide roof member, so as to introduce the heat-sensitive adhesive sheet to the entrance of the thermal activation device.

According to this method, since the heat-sensitive adhesive sheet can be deflected downward to form a concave shape and be cut to a predetermined length, smooth deflection of the sheet, in consonance with the direction in which the heat-sensitive adhesive sheet is wound, can be easily performed.

The step of deflecting the heat-sensitive adhesive sheet downward to form a concave shape is a step of deflecting the heat-sensitive adhesive sheet by controlling the speed of the first conveying unit, part of the printing device, for conveying the heat-sensitive adhesive sheet and the speed of the second conveying unit, part of the thermal activation device, for conveying the heat-sensitive adhesive sheet.

The heat-sensitive adhesive sheet may be unwound from a roll member around which the heat-sensitive adhesive sheet is wound, with the printing enabled layer inside, and be supplied to the printing device.

According to the present invention, when a heat-sensitive adhesive sheet that is wound in a different direction from the conventional is employed, the sheet can be easily and smoothly deflected. Therefore, a desired adhesive label can be easily produced by adjusting the length of the heat-sensitive adhesive sheet, and the manufacturing efficiency can be increased.

DETAILED DESCRIPTION OF THE PREFERRED EMBODIMENT

The preferred embodiment of the present invention will now be described while referring to the accompanying drawings.

Figure 1:
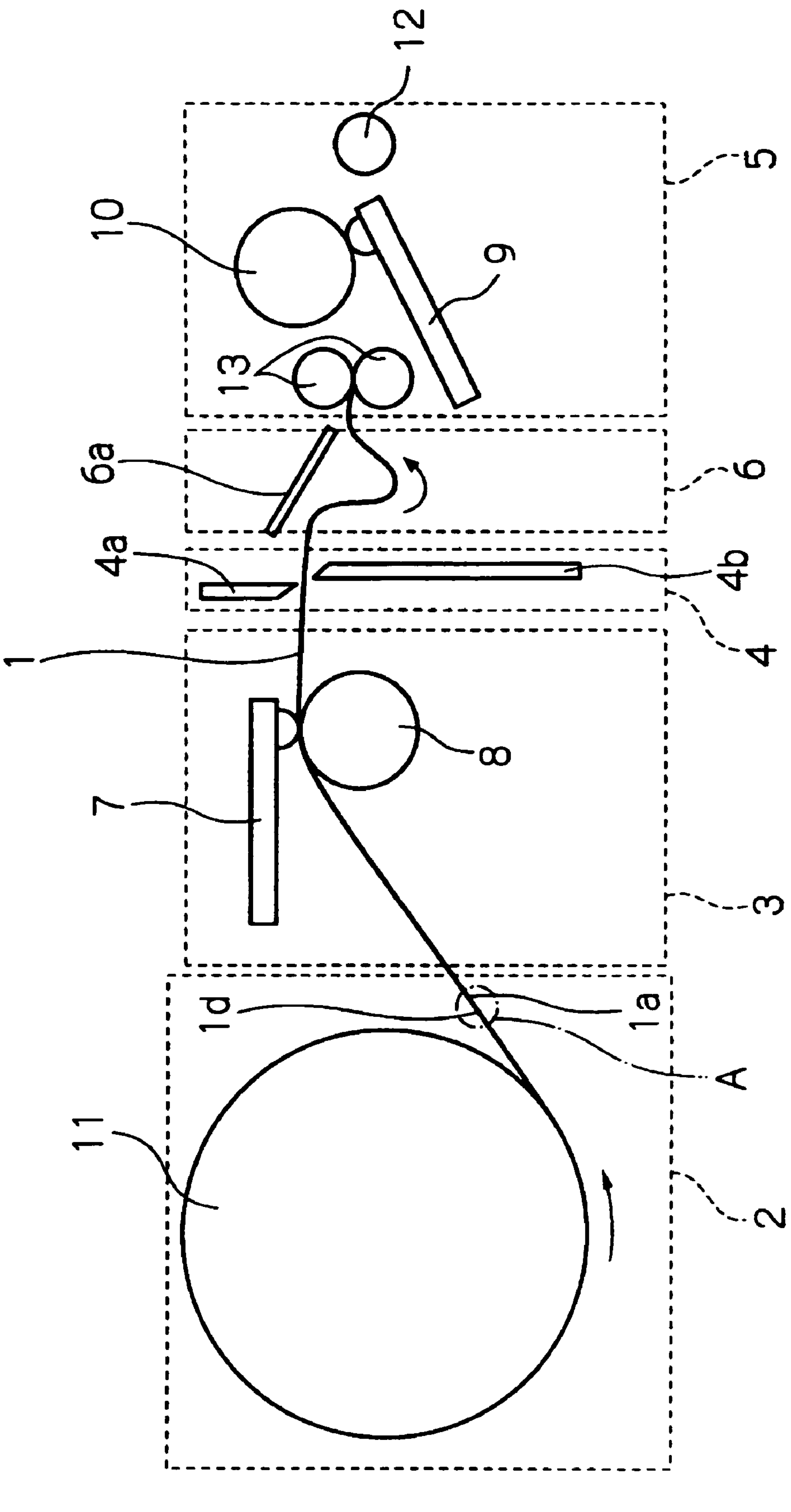
FIG. 1 is a schematic side view of the general configuration of a printer according to the present invention.

FIG. 1 is a schematic cross-sectional view of the internal configuration of a printer according to the present invention for manufacturing adhesive labels based on a heat-sensitive adhesive sheet. The basic configuration of the printer using a heat-sensitive adhesive sheet will be briefly explained. This printer includes: a roll member storage unit 2, for holding a roll member 11 formed by winding around it a heat-sensitive adhesive sheet 1; a printing device 3, for printing on a printing enabled layer 1*d* (see FIG. 2) of the heat-sensitive adhesive sheet 1; a cutter device 4, for cutting the heat-sensitive adhesive sheet 1 to a predetermined length; a thermal activation device 5, for thermally activating a heat-sensitive adhesive layer 1*a* (see FIG. 2) of the heat-sensitive adhesive sheet 1; and a guide portion 6, for guiding the heat-sensitive adhesive sheet 1 from the cutter device 4 to the thermal activation device 5.

The foil member 11, formed by winding the heat-sensitive adhesive sheet 1 into a roll, is stored in the roll member storage unit 2.

The printing device 3 includes: a thermal head 7 for printing (heating means for printing), which has a plurality of heat generation elements that are constituted by comparatively small resistor members arranged in the widthwise direction (direction perpendicular to the paper plane in FIG. 1) to enable dot printing; and a platen roller 8 for printing (first conveying unit), which is pressed against the thermal head 7. The thermal head 7 is positioned so that it contacts the printing enabled layer 1*d* of the heat-sensitive adhesive sheet 1, which is fed from the roll member storage unit 2, and the platen roller 8 is pressed against the thermal head 7. The thermal head 7 has the same structure as the print head of a well known thermal printer, for which a glass ceramics protective film is deposited on the surfaces of a plurality of heat-generating resistor members formed on a ceramic substrate.

The cutter device 4 cuts, to a predetermined length, the heat-sensitive adhesive sheet 1 printed by the printing device 3 and forms the sheet 1 into label forms. The cutter device 4 includes: a movable blade 4*a* propelled by a drive source (not shown), such as an electric motor, and a fixed blade 4*b* located opposite the movable blade 4*a*.

In the guide portion 6, a guide roof member 6*a* is arranged above the path along which the heat-sensitive adhesive sheet 1 is conveyed from the cutter device 4 to the thermal activation device 5. As will be described later, the guide roof member 6*a* is not only used to smoothly introduce the heat-sensitive adhesive sheet 1 to the thermal activation device 5, but also to hold the heat-sensitive adhesive sheet 1 between the delivery point or exit for the cutter device 4 and the insertion point or entrance for the thermal activation device 5, while the sheet 1 is deflected downward and assumes a concave shape (see FIGS. 4A to 4D), so that the heat-sensitive adhesive sheet 1 can be cut to a desired length by the cutting device 4.

The thermal activation device 5 includes: a thermal head 9, used for thermal activation, that has a plurality of heat generation elements (not shown); a platen roller 10, for thermal activation; a pair of insertion rollers 13; and a discharge roller 12. The thermal head 9 is positioned so that it contacts the heat-sensitive adhesive layer 1*a* of the heat-sensitive adhesive sheet 1, and the platen roller 10 is pressed against the thermal head 9. In this embodiment, the pair of insertion rollers 13 is specifically called a second conveying unit.

The thermal head 9 has the same structure as the thermal head 7 of the above described printing device 3, i.e., the same structure as the print head of a well known thermal printer, for which a glass ceramics protective film is deposited on the surfaces of multiple heat-generating resistor members mounted on a ceramic substrate. Since the same structure is employed for the thermal head 7 for printing and the thermal head 9 for thermal activation, the parts can be used in common and manufacturing costs can be reduced. Furthermore, since to generate heat multiple small heat generation elements (heat-generating resistor members) are used to constitute the thermal head, an advantage of this structure is that a uniform temperature can be easily distributed across a wide range, compared with a structure wherein a single (or an extremely few) large heat generation element is employed to generate heat. It should be noted 'that unlike the heat generation elements of the thermal head 7, the heat generation elements of the thermal head 9 need not be divided into dot units, and sequential resistor elements may be employed.

The insertion point for the thermal activation device 1, i.e., the nip portion for the paired insertion rollers 13, is lower than the delivery point for the cutter device 4, i.e., the space between the movable blade 4*a* and the fixed blade 4*b*. Thus, a flat plate is used to form the guide roof member 6*a*, which is positioned above the path along which the heat-sensitive adhesive sheet 1 is conveyed and inclines obliquely downward from the delivery point for the cutter device 4 to the insertion point for the thermal activation device 5.

Figure 2:
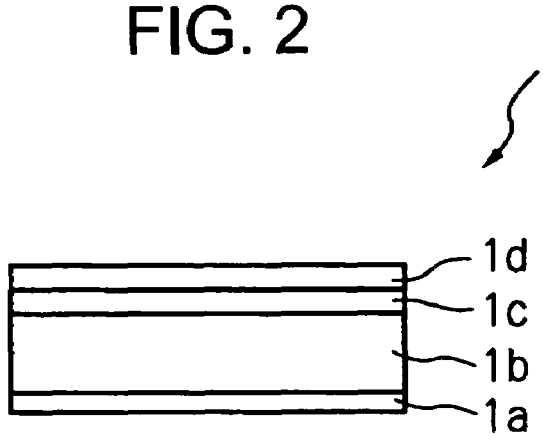
FIG. 2 is an enlarged diagram showing a heat-sensitive adhesive sheet at portion A in FIG. 1.
Figure 5:
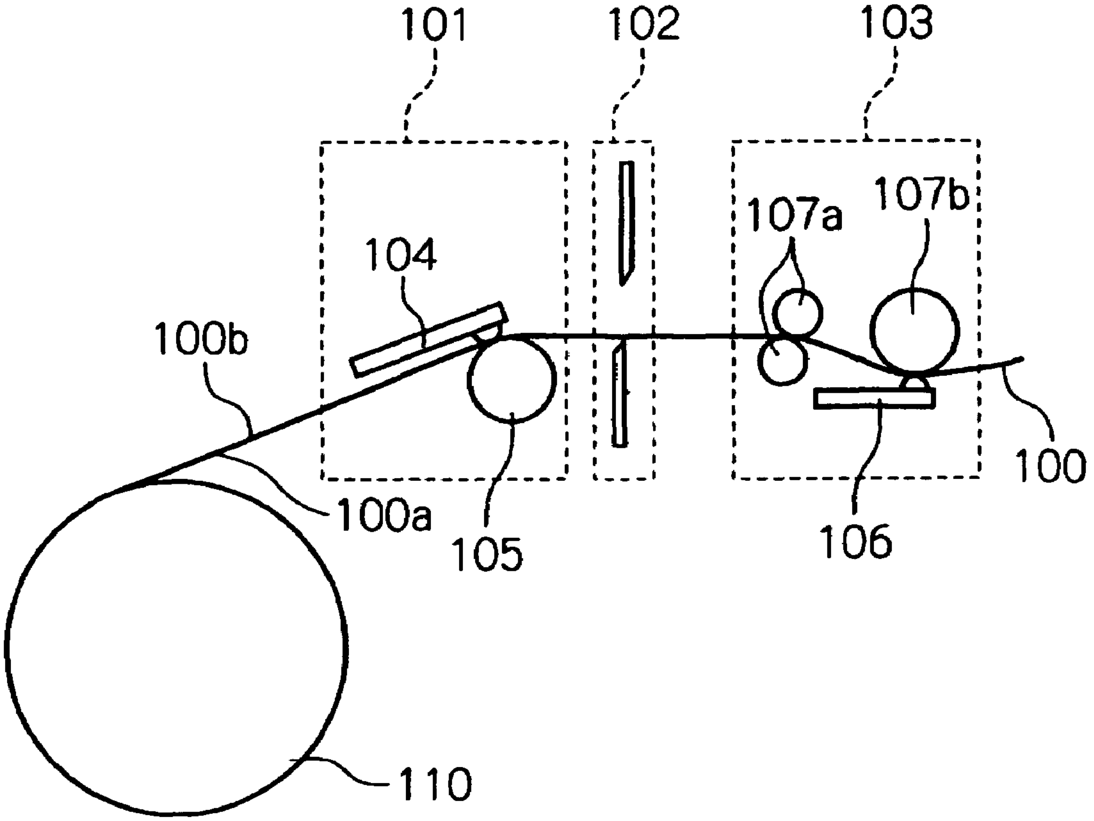
FIG. 5 PRIOR ART
FIG. 5 is a schematic side view of the general configuration of a first example conventional printer.

As the heat-sensitive adhesive sheet 1 used for this embodiment, as shown in FIG. 2 for example, an insulating layer 1*c* and a heat-sensitive color developing layer (a printable or printing enabled layer) 1*d* are formed on the obverse side of a sheet base material 1*b*, and the heat-sensitive adhesive layer 1*a* is obtained by coating, drying and solidifying a heat-sensitive adhesive agent that contains as the main element a thermoplastic resin or a solid plastic resin, for example. It should be noted that the structure of the heat-sensitive adhesive sheet 1 is not limited to the one shown, and that various other structures can be employed so long as the heat-sensitive adhesive layer 1*a* is included. As an example, a heat-sensitive adhesive sheet 1 may also be employed for which an insulating layer 1*c* is not included or for which a protective layer or a color printed layer (a layer on which printing is performed in advance) is deposited on the surface of the printing enabled layer 1*d*, or on which a thermal coat layer is deposited (neither structure is shown). In this embodiment, the roll member 11 is formed by winding the heat-sensitive adhesive sheet 1 around it with the printing enabled layer 1*d* on the inside and the heat-sensitive adhesive layer 1*a* on the outside. One of the reasons this is done is to prevent dirt from accumulating on the printing enabled layer 1*d* on which label information such as desired characters, symbols, numbers and images are to be printed.

The platen roller 8 used for printing, the paired insertion rollers 13, the platen roller 10 used for thermal activation and the discharge roller 12 constitute a conveying mechanism for conveying the heat-sensitive adhesive sheet 1 through the printer.

Furthermore, although not shown, the printer also includes a controller for driving the conveying mechanism, the thermal head 7 for printing and the thermal head 9 for thermal activation, for example, and for controlling the operations of these sections.

Figure 3:
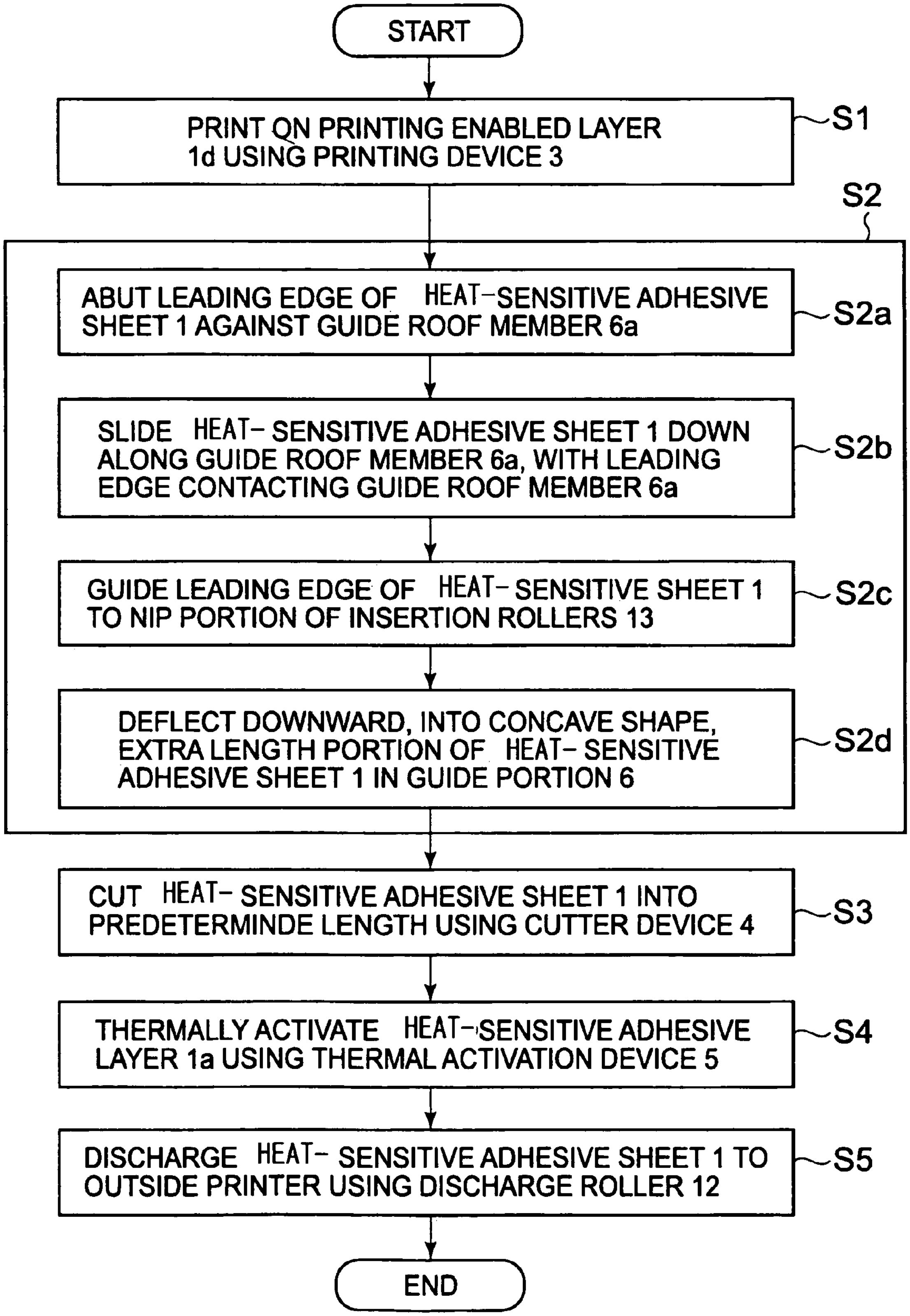
FIG. 3 is a flowchart showing an adhesive label manufacturing method according to the present invention.

While referring to the flowchart in FIG. 3, an explanation will be given for a method that uses the thus arranged printer to produce desired adhesive labels from the heat-sensitive adhesive sheet 1.

First, the heat-sensitive adhesive sheet 1 is pulled forward, unwinding it from the roll member 11 in the roll member storage unit 2, and is inserted between the thermal head 7 and the platen roller 8 of the printing device 3. A print signal is supplied by the controller to the thermal head 7, the heat generation elements of the thermal head 7 are selectively driven at an appropriate timing to generate heat, and printing is performed on the printing enabled layer 1*d* of the heat-sensitive adhesive sheet 1. Synchronized with the driving of the 'thermal head 7, the platen roller 8 is rotated to convey the heat-sensitive adhesive sheet 1 in a direction perpendicular to the direction in which the heat generation elements of the thermal head 7 are arranged, e.g., the direction perpendicular to the array of heat generation elements. Specifically, alternately performed are the printing of one line by the thermal head 7 and the conveying of the heat-sensitive adhesive sheet 1 a predetermined distance (the equivalent of one line) by the platen roller 8 are so that desired characters, numbers, symbols or images are printed on the heat-sensitive adhesive sheet 1 (step S1).

The thus printed heat-sensitive adhesive sheet 1 is passed between the-movable blade 4*a* and the fixed blade 4*b* of the cutter device 4, and reaches the guide roof member 6*a*. At the guide roof member 6*a*, the heat-sensitive adhesive sheet 1 is appropriately deflected, so that the length between the leading edge of the heat-sensitive adhesive sheet 1 to the portion positioned between the movable blade 4*a* and the fixed blade 4*b* of the cutter device 4 is designated,(step S2). The step of deflecting the heat-sensitive adhesive sheet 1 will be described in detail while referring to FIGS. 4A to 4D.

Figure 4A:
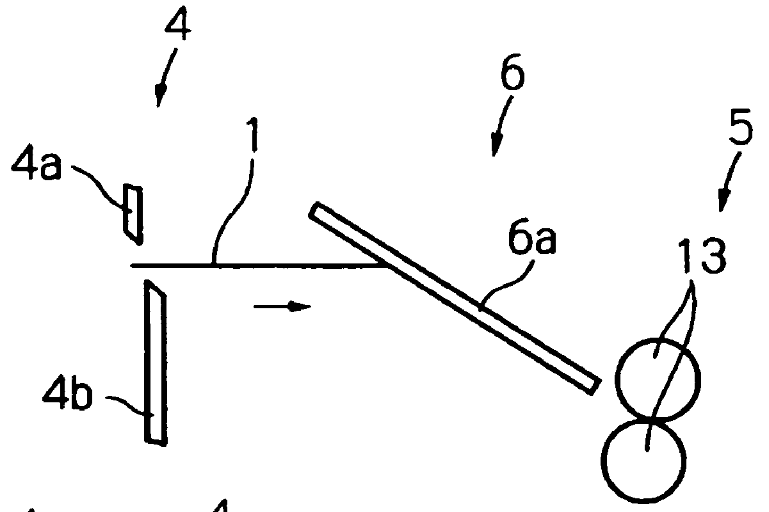
FIGS. 4A to 4D are explanatory diagrams sequentially showing the steps for deflecting the heat-sensitive adhesive sheet downward to form a concave shape.
Figure 4B:
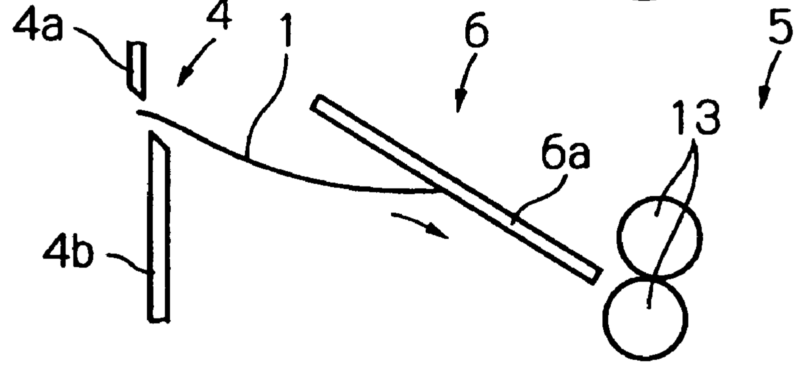
Figure 4C:
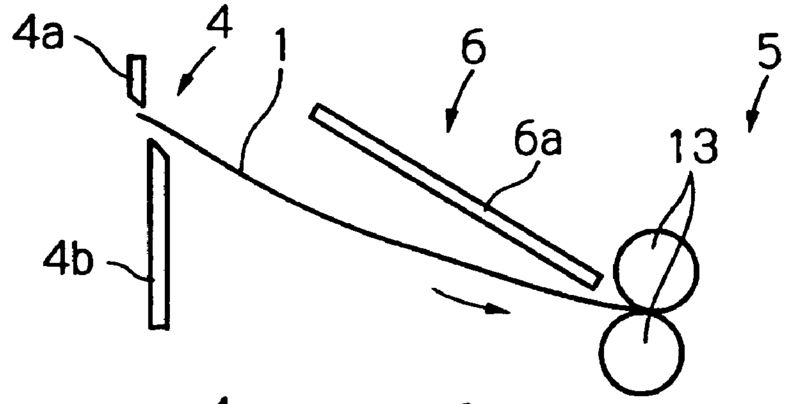
Figure 4D:
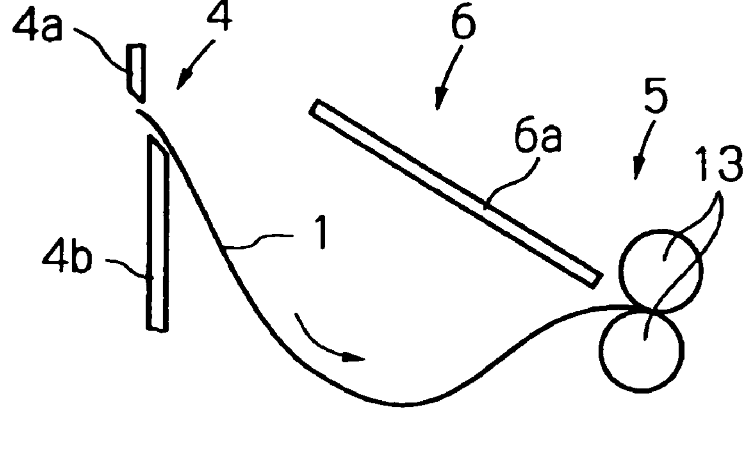

First, the leading edge of the heat-sensitive adhesive sheet 1, which has been forwarded by the platen roller 8, is passed between the movable blade 4*a* and the fixed blade 4*b* of the cutter device 4, and as shown in FIG. 4A, abuts upon the guide roof member 6*a* (step S2*a*). As the heat-sensitive adhesive sheet 1 is forwarded further, as shown in FIG. 4B, it slides down along the guide roof member 6*a* (step S2*b*). Then, as shown in FIG. 4C, the leading edge of the heat-sensitive adhesive sheet 1 is guided along the guide roof member 6*a* to the nip portion of the pair of insertion rollers 13 (step S2*c*). During this process, the leading edge of the heat-sensitive adhesive sheet 1 continues to remain in contact with the guide roof member 6*a*. By the time whereat the leading edge of the heat-sensitive adhesive sheet 1 has been guided to the nip portion, the insertion rollers 13 have been rotated, and when the leading edge is gripped at the nip portion and the heat-sensitive adhesive sheet 1 is appropriately held, the insertion rollers 13 are either halted, or rotated at a conveying speed slower than that of the platen roller 8. Therefore, the portion of the heat-sensitive adhesive sheet 1 present in the guide portion 6 is gradually increased so that it exceeds the linear length of the path, extending from the cutter device 4 to the thermal activation device 5, along which the heat-sensitive adhesive sheet 1 is conveyed, i.e., extra length is provided for the relevant portion of the heat-sensitive adhesive sheet 1. As shown in FIG. 4D, the extra length portion is deflected downward so that it bows and assumes a concave shape (step S2*d*), and the extra length portion accumulates in the space between the delivery point (exit) of the cutter device 4 and the insertion point (entrance) of the thermal activation device 5. At this time, the top of the sheet conveying path is covered with the guide roof member 6*a*, and since the guide roof member 6*a* is inclined obliquely forward, the heat-sensitive adhesive sheet 1 is deflected not upward but downward to assume the concave shape.

Thereafter, the speeds and the operating periods of the platen roller 8 and the insertion rollers 13 are monitored by using a sensor (not shown). When the length from the leading edge of the deflected heat-sensitive adhesive sheet 1 to the portion located between the movable blade 4*a* and the fixed blade 4*b* of the cutter device 4 corresponds to the length of an adhesive label to be produced, the platen roller 8 is temporarily halted and the heat-sensitive adhesive sheet 1 is cut by driving the movable blade 4*a*.(step S3). In this manner, a label having a predetermined length can be formed from the heat-sensitive adhesive sheet 1.

Following this, the insertion rollers 13 and the platen roller 10 for thermal activation are rotated, and feed to the thermal activation device 5, the label, on which required printing has been performed in the above described manner, having the predetermined length that has been formed from the heat-sensitive adhesive sheet 1. In the thermal activation device 5, in the state wherein the label of the heat-sensitive adhesive sheet 1 is sandwiched between the thermal head 9 and the platen roller 10, the controller drives the thermal head 9 so as to thermally activate the heat-sensitive adhesive layer la that contacts the thermal head 9. At the same time, the platen roller 10 is rotated to feed the label of the heat-sensitive adhesive sheet 1, and while the heat-sensitive adhesive sheet 1 is pressed against the thermal head 9 by the platen roller 10, the thermal head 9 is activated to generate heat, so as to thermally activate the portion of the heat-sensitive adhesive layer la that contacts the thermal head 9 (step S4). At the same time, as the platen roller 10 is rotated, the label formed from the heat-sensitive adhesive sheet 1 is conveyed, while along its entire surface the heat-sensitive adhesive layer la is brought into contact with the thermal head 9. Therefore, adhesion is manifested along the entire heat-sensitive adhesive layer la on one side of the label formed from the heat-sensitive adhesive sheet 1.

As a result, the processing is completed for the production, from the heat-sensitive adhesive sheet 1, of an adhesive label having a predetermined length, along one side of which desired printing has been performed and along the other side of which adhesion has been manifested, and the adhesive label is discharged, outside the printer, by the discharge roller 12 (step S5).

When the pair of insertion rollers 13 are to be halted at the time whereat the leading edge of the heat-sensitive adhesive sheet 1 has been guided to the nip portion of the insertion rollers 13, the insertion rollers 13 must be halted before the leading edge of the heat-sensitive adhesive sheet 1 contacts the thermal head 9, e.g., immediately after the leading edge is gripped and held at the nip portion. This is because the contact portion of the heat-sensitive adhesive sheet 1 will be heated excessively if contacting the thermal head 9 when the platen roller 10 and/or the insertion rollers 13 are halted.

Further, when the heat-sensitive adhesive sheet 1 is to be deflected by slowly rotating the insertion rollers 13, for the same reasons as described above, the insertion rollers 13 and the platen roller 10 must be continuously rotated without stopping, at least after the heat-sensitive adhesive sheet 1 contacts the thermal head 9. Since the heat-sensitive adhesive sheet 1 is deflected at the guide portion 6, during the cutting process performed by the cutter device 4, the thermal head 9 and the platen roller 10 can be continuously operated, and the thermal activation process can be performed in parallel.

As described above, according to this embodiment, at the guide portion 6 between the cutter device 4 and the thermal activation device 5, the heat-sensitive adhesive sheet 1 is deflected downward and assumes a concave shape, so that the length of the heat-sensitive adhesive sheet 1 can be adjusted and an adhesive label having a desired length can be easily produced. Further, even when, as in the configuration in FIG. 1, the roll member 11 is formed by winding the heat-sensitive adhesive sheet 1 with the printing enabled layer 1*d* inside and the heat-sensitive adhesive layer 1*a* outside, is employed, since the winding direction of the roll member 11 matches the direction in which the heat-sensitive adhesive sheet 1 is deflected, the heat-sensitive adhesive sheet 1 can be smoothly conveyed, and the sheet 1 can be accurately cut to a predetermined length.

Figure 6:
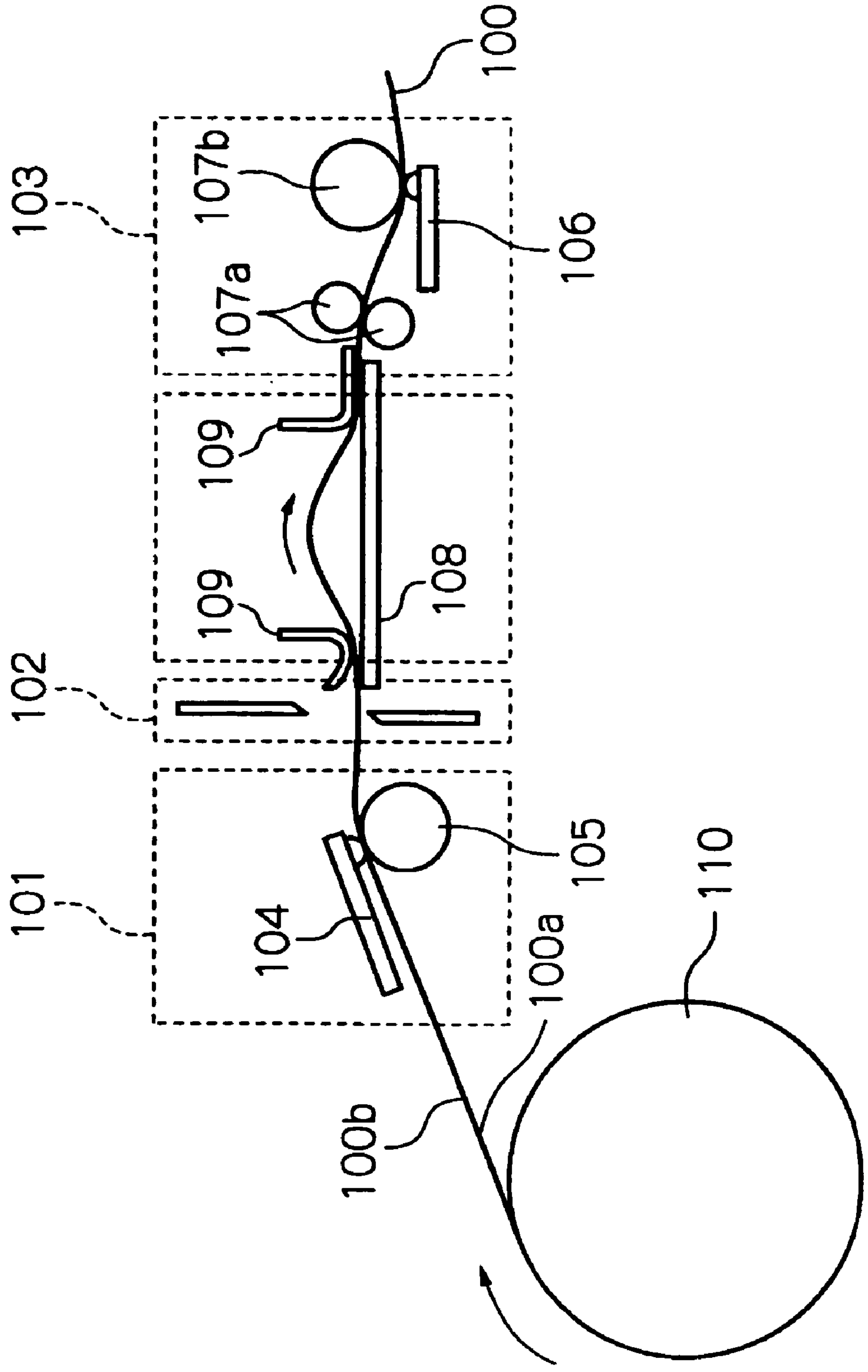
FIG. 6 PRIOR ART
FIG. 6 is a schematic side view of the general configuration of a second example conventional printer.
Figure 7:
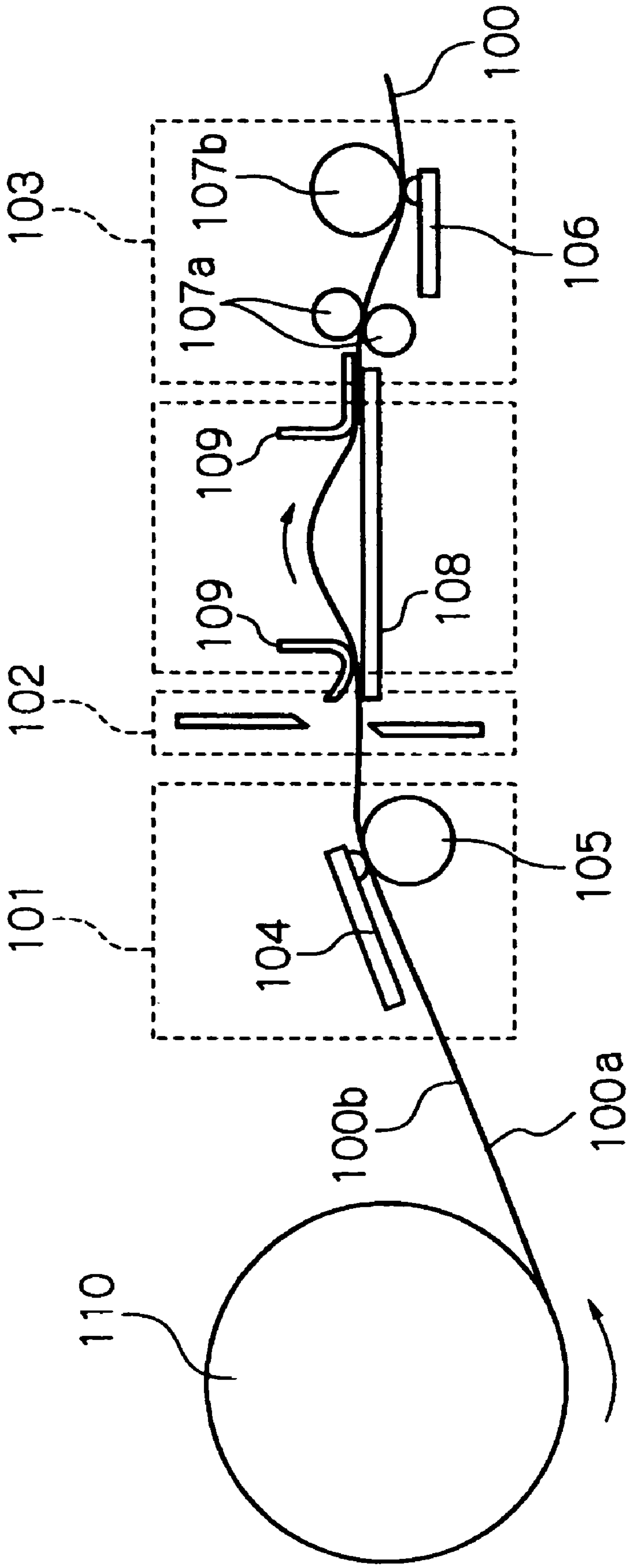
FIG. 7 is a schematic explanatory diagram showing an example wherein a heat-sensitive adhesive sheet can not be smoothly conveyed by the printer in FIG. 6.

According to the conventional configuration disclosed in Japanese Patent Laid-Open Publication No. 2003-316265, as shown in FIG. 6, it is very easy for the heat-sensitive adhesive sheet to be deflected upward, above the guide floor member. However, merely by reversing the structure of the guide portion, the heat-sensitive adhesive sheet can not be deflected downward. This is because once the leading edge of the heat-sensitive adhesive sheet is deflected downward, since the leading edge of the heat-sensitive adhesive sheet that is being conveyed forward is suspended by gravity, it can not be raised to the horizontal position and returned to the conveying path. Therefore, the extra length portion of the heat-sensitive adhesive sheet is simply suspended by gravity and separated from the conveying path. As described above, conventionally, even when downward deflection of a sheet is demanded, no structure that enables this has been proposed.

On the other hand, according to this invention, as shown in FIGS. 4A to 4D, first, the insertion point of the thermal activation device 5 is located lower than the delivery point of the cutter device 4, and second, the guide roof member 6*a*, which inclines obliquely downward in the forward direction, is provided above the conveying path, between the delivery point and the insertion point. With this arrangement, the deflection downward of the heat-sensitive adhesive sheet 1 is enabled by exploiting the resilience of the heat-sensitive adhesive sheet 1. That is, when the leading edge of the heat-sensitive adhesive sheet 1 abuts upon the guide roof member 6*a*, as shown in FIG. 4A, the resilience of the heat-sensitive adhesive sheet 1 prevents the leading edge from separating from the guide roof member 6*a* as it slides down, as shown in FIG. 4B, and is guided to the nip portion between the pair of insertion rollers 13, as shown in FIG. 4C. Thereafter, as shown in FIG. 4D, when the leading edge has been gripped and is held at the nip portion of the pair of insertion rollers 13, which are not rotated or are rotated slowly, and the heat-sensitive adhesive sheet 1 is conveyed further, the heat-sensitive adhesive sheet 1 is deflected downward and assumes a concave shape. With this arrangement, the heat-sensitive adhesive sheet 1 is prevented from being freely suspended by gravity, and can be deflected downward smoothly.

In order to obtain the smooth deflection shown in FIGS. 4A to 4D, the angle and the length of the guide roof member 6*a* must be appropriately designated, while taking into account the resilience of the heat-sensitive adhesive sheet l, determined in accordance with the material and the thickness of the heat-sensitive adhesive sheet 1, so that the leading edge will not be folded when it abuts upon the guide roof member 6*a*, and will not be separated from the guide roof member 6*a* and freely suspended by gravity.

What is claimed is:

1. A printer comprising:

a printing device for printing a printing enabled layer of a heat-sensitive sheet that has the printing enabled layer on one face of a sheet base material and a heat-sensitive adhesive layer on the other face;

a cutting device, located downstream of the printing device, for cutting the heat-sensitive adhesive sheet to a predetermined length;

a thermal activation device, located downstream of the cutting device, for activating the heat-sensitive adhesive layer using heat; and a guide portion, located between the cutting device and the thermal activation device, for deflecting the heat-sensitive adhesive sheet downward in a concave shape, wherein an insertion point of the thermal activation device for the heat-sensitive adhesive sheet is located at a position lower than a delivery point of the cutting device for the heat-sensitive adhesive sheet, wherein a guide roof member is provided for the guide portion that is located above a sheet conveying path, extending from the delivery point of the cutting device to the insertion point of the thermal activation device, and wherein, when the leading edge of the heat-sensitive adhesive sheet, which has been delivered to the cutting device from the delivery point, abuts upon the guide roof member, the heat-sensitive adhesive sheet, while in contact with the guide roof member, is slid down and guided to the entrance of the thermal activation device.

2. A printer according to claim 1, further comprising a roll member storage unit for holding a roll member around which is wound the heat-sensitive adhesive sheet to be supplied to the printing device.

3. A printer according to claim 1, wherein the printing device includes a heater, used for printing, for contacting and heating the printing enabled layer, and a first conveying unit for conveying the heat-sensitive adhesive sheet;

wherein the thermal activation device includes a heater, used for thermal activation, for contacting and heating the heat-sensitive adhesive layer, and a second conveying unit for conveying the heat-sensitive adhesive sheet; and wherein, by controlling the second conveying unit and the first conveying unit speeds, the heat-sensitive adhesive sheet is deflected downward to form a concave shape at the guide portion,

4. An adhesive label manufacturing method comprising:

a printing step, using a printing device, for heating and printing a printing enabled layer of a heat-sensitive sheet that has the printing enabled layer on one face of a sheet base material and a heat-sensitive adhesive layer on the other face;

a cutting step, following the printing step, of cutting the heat-sensitive adhesive sheet to a predetermined length using a cutting device;

a thermal activation step, following the cutting step, of heating and thermally activating the heat-sensitive adhesive layer using a thermal activation device; and a step, preceding the cutting step, of deflecting the heat-sensitive adhesive sheet downward, so as to form a concave shape between the cutting device and the thermal activation device, until a portion extending from the leading edge of the heat-sensitive adhesive sheet to a portion facing the cutting device reaches a desired length for an adhesive label, wherein the step of deflecting the heat-sensitive adhesive sheet downward into a concave shape includes a step of conveying the heat-sensitive adhesive sheet so that the leading edge abuts against a guide roof member positioned above the sheet path and extending from a delivery point for the cutting device to an insertion point for the thermal activation device, the position of the insertion point being lower than the delivery point, and sliding the heat-sensitive adhesive sheet, while in contact with the guide roof member, so as to introduce the heat-sensitive adhesive sheet to the entrance of the thermal activation device.

5. An adhesive label manufacturing method according to claim 4, wherein the step of deflecting the heat-sensitive adhesive sheet downward to form a concave shape is a step of deflecting the heat-sensitive adhesive sheet by controlling the speed of a first conveying unit, which is part of the printing device, for conveying the heat-sensitive adhesive sheet and the speed of a second conveying unit, which is part of the thermal activation device, for conveying the heat-sensitive adhesive sheet.

6. An adhesive label manufacturing method according to claim 4, wherein the heat-sensitive adhesive sheet is unwound from a roll member around which the heat-sensitive adhesive sheet is wound, with the printing enabled layer facing the inside of the roll member, and is supplied to the printing device.

7. A method of manufacturing an adhesive label, comprising the steps:

providing a heat-sensitive adhesive sheet having a printable layer on one side and a heat-sensitive adhesive layer on the other side;

printing label information on the printable layer of the heat-sensitive adhesive sheet;

conveying the printed heat-sensitive adhesive sheet past a cutting device, without cutting the sheet, and causing a leading edge of the sheet to abut against a downwardly inclined guide member that deflects the sheet downwardly and introduces the leading edge of the sheet to an entrance of a thermal activation device, and thereafter continuing conveying the sheet past the cutting device while the sheet bows downwardly in a concave shape until a desired length of sheet has accumulated in the space between an exit of the cutting device and the entrance of the thermal activation device;

cutting the printed heat-sensitive adhesive sheet to the desired length by the cutting device; and thermally activating the heat-sensitive adhesive layer of the cut heat-sensitive adhesive sheet by the thermal activation device to provide an adhesive label.

8. A method according to claim 7; wherein the thermal activation device has a pair of insertion rollers that define the entrance of the thermal activation device and between which the leading edge of the printed heat-sensitive adhesive sheet is introduced.

9. A method according to claim 7; wherein the conveying step is carried out by controlling the speed of a first conveying unit that conveys the heat-sensitive adhesive sheet to the entrance of the thermal activation device and the speed of a second conveying unit that conveys the heat-sensitive adhesive sheet through the thermal activation device.

10. A method according to claim 9; wherein the printing step is carried out by a printing device; and wherein the first conveying unit constitutes part of the printing device and the second conveying unit constitutes part of the thermal activation unit.

11. A method according to claim 10; wherein the first conveying unit conveys the heat-sensitive adhesive sheet at a faster speed than the second conveying unit to cause the sheet to bow downwardly in a concave shape and accumulate in the space in the space between the exit of the cutting device and the entrance of the thermal activation device.

12. A method according to claim 10; wherein the first conveying unit comprises a platen roller for printing, and the second conveying unit comprises a pair of insertion rollers.

13. A method according to claim 10; wherein the providing step comprises providing the heat-sensitive adhesive sheet wound in the form of a roll with the printable surface facing the inside of the roll.

14. A method according to claim 7; wherein the providing step comprises providing the heat-sensitive adhesive sheet wound in the form of a roll with the printable surface facing the inside of the roll.

* * * * *

UNITED STATES PATENT AND TRADEMARK OFFICE

CERTIFICATE OF CORRECTION

PATENT NO. : 7,601,238 B2
APPLICATION NO. : 11/288734
DATED : October 13, 2009
INVENTOR(S) : Masanori Takahashi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 984 days.

Signed and Sealed this

Fifth Day of October, 2010

David J. Kappos

*Director of the United States Patent and Trademark Office*